(12) United States Patent
Lee et al.

(10) Patent No.: US 11,660,847 B2
(45) Date of Patent: May 30, 2023

(54) PROTECTIVE FILM FOR WINDSHIELD OF VEHICLE

(71) Applicant: STEK CO., LTD., Seoul (KR)

(72) Inventors: Changsuk Lee, Seoul (KR); Inhwan Oh, Seongnam-si (KR); Subin Park, Seoul (KR)

(73) Assignee: STEK CO., LTD., Seoul (KR)

( * ) Notice: Subject to any disclaimer, the term of this patent is extended or adjusted under 35 U.S.C. 154(b) by 0 days.

(21) Appl. No.: 17/104,152

(22) Filed: Nov. 25, 2020

(65) Prior Publication Data
US 2022/0024194 A1 Jan. 27, 2022

(30) Foreign Application Priority Data
Jul. 24, 2020 (KR) .......................... 10-2020-0092513

(51) Int. Cl.
*B32B 27/40* (2006.01)

(52) U.S. Cl.
CPC ........ *B32B 27/40* (2013.01); *B32B 2307/558* (2013.01); *B32B 2307/71* (2013.01); *B32B 2307/732* (2013.01); *B32B 2307/762* (2013.01); *B32B 2375/00* (2013.01); *B32B 2405/00* (2013.01); *B32B 2605/006* (2013.01)

(58) Field of Classification Search
CPC .............. B32B 27/40; B32B 2307/558; B32B 2307/71; B32B 2307/732; B32B 2307/762; B32B 2375/00; B32B 2405/00; B32B 2605/006
See application file for complete search history.

(56) References Cited

U.S. PATENT DOCUMENTS

| 4,725,662 A * | 2/1988 | Kuga ................ B32B 17/10018 428/38 |
| 2004/0127594 A1* | 7/2004 | Yang ................... C08F 290/061 522/114 |
| 2020/0115592 A1* | 4/2020 | Kim ........................ C09J 7/255 |

FOREIGN PATENT DOCUMENTS

WO WO-2018190564 A1 * 10/2018 .............. C08J 7/043

* cited by examiner

*Primary Examiner* — Maria V Ewald
*Assistant Examiner* — Ethan Weydemeyer

(57) ABSTRACT

The present invention relates to a protective film for a windshield of a vehicle, which can be installed on a curved portion of the windshield of the vehicle without a thermoforming process, thereby improving the workability of a worker, and improving impact resistance to effectively protect the windshield of the vehicle.

8 Claims, 7 Drawing Sheets

(A)           (B)           (C)

(A)

(B)

(C)

(D)

PROTECTIVE FILM FOR WINDSHIELD OF VEHICLE

BACKGROUND

1. Field of the Invention

The present invention relates to a protective film for a windshield of a vehicle, which can be installed on a curved portion of the windshield of the vehicle without a thermoforming process, thereby improving the workability of a worker, and effectively protecting the windshield of the vehicle by improving impact resistance.

2. Description of the Related Art

Protective films for windshields of vehicles are generally manufactured by providing plastic films including PET, PMMA, and PC as a base layer, performing a hard coating on an upper surface of the base layer, and performing an adhesive coating on a lower surface of the base layer. In particular, a protective film including a base layer formed of PET has excellent transmittance so that excellent visibility can be ensured, and represents superior impact resistance and durability as compared with other plastic films so that it is mainly used as a protective film for a windshield of a vehicle. Techniques related to a protective film, which includes a plastic film as a base layer, for a windshield of a vehicle are proposed in U.S. patent application Ser. No. 11/399,303 (Patent document 1) which discloses a protective film including a PET layer as a base layer, and Japanese Patent No. 4266623 (Patent document 2) which discloses a transparent plastic film including a hard coat layer.

However, when the protective films disclosed in Patent documents 1 and 2 are applied to a curved portion of a windshield of a vehicle, a thermoforming process for applying heat such as hot air to the protective film is required, so there is a problem that it takes a very long time to install the protective film. In addition, if the hard coating is performed on an upper surface of a plastic film base layer as in Patent document 2, there is a problem that the impact absorption function is lowered because both the base layer and the coating layer are hard. In particular, there is a problem to protect the windshield of the vehicle from being broken because there is a limitation to absorb the impact from stones or other dangerous substances flying to the windshield of the vehicle while driving.

Meanwhile, the protective film for the windshield of the vehicle may include an infrared or ultraviolet ray blocking function, so the protective film can prevent an increase in temperature inside the vehicle and protect the driver's skin when the protective film is attached to the windshield. As a technique for this, Japanese Patent No. 5588588 (Patent document 3) discloses a near-infrared shielding film for a windshield of a vehicle, which has a hard coat layer including an infrared absorber.

However, as disclosed in Patent document 3, the infrared ray blocking function can be secured if an infrared absorber is directly added to the hard coat layer, but the physical properties of the film may easily deteriorate due to the influence of climate and ultraviolet rays according to seasonal changes, so that there is a problem that maintenance costs are relatively high due to a short replacement cycle of the protective film.

(Patent Document 0001) Patent Document 1: U.S. patent application Ser. No. 11/399,303
(Patent Document 0002) Patent Document 2: Japanese Patent No. 4266623
(Patent Document 0003) Patent Document 3: Japanese Patent No. 5588588

SUMMARY

An object of the present invention is to provide a protective film for a windshield of a vehicle, which can be installed on a curved portion of the windshield of the vehicle without a thermoforming process, thereby improving the workability of a worker, and effectively protecting the windshield of the vehicle by improving impact resistance.

In order to achieve the above object, the present invention provides a protective film for a windshield of a vehicle, which includes an adhesive layer including an acrylic copolymer, a curing agent, and a solvent; an elastic layer disposed on the adhesive layer and including a polyurethane acrylate oligomer, an acrylate monomer, and a photoinitiator; and a self-healing layer disposed on the elastic layer, including a urethane resin and an isocyanate curing agent, and having a function of healing scratches with impact resistance, wherein the elastic layer has a thickness greater than a thickness of the self-healing layer, and strength and hardness lower than those of a PET film having a tensile strength of 160 MPa or move and a hardness of 2 H to 3 H, the elastic layer is laminated between the self-healing layer and the adhesive layer, and the protective film is attached to a curved portion of the windshield of the vehicle without a thermoforming process by an elastic force of the elastic layer.

According to some embodiments, the elastic layer may include 25 to 40 parts by weight of the polyurethane acrylate oligomer, 50 to 70 parts by weight of the acrylate monomer, and 0.1 to 5 parts by weight of the photoinitiator.

According to some embodiments, the self-healing layer may include 100 parts by weight of the urethane resin, and 30 to 50 parts by weight of the isocyanate curing agent.

According to some embodiments, the adhesive layer may include 100 parts by weight of the acrylic copolymer, 0.1 to 5 parts by weight of the curing agent, and 90 to 110 parts by weight of the solvent.

According to some embodiments, the elastic layer may have a thickness of 100 to 200 micrometers, the self-healing layer may have a thickness of 20 to 40 micrometers, and the adhesive layer may have a thickness of 5 to 15 micrometers.

According to some embodiments, the protective film for the windshield of the vehicle may have impact resistance characteristics of 2000 mJ to 3000 mJ based on a Du pont impact test.

According to some embodiments, the protective film for the windshield of the vehicle may further include a primer layer disposed at one or more positions between the elastic layer and the self-healing layer, and between the elastic layer and the adhesive layer, and including a urethane resin and an isocyanate curing agent.

According to some embodiments, the primer layer may include 100 parts by weight of the urethane resin, and 1 to 10 parts by weight of the isocyanate curing agent.

According to some embodiments, the primer layer may further include at least one of a UV blocking agent and an IR blocking agent.

According to some embodiments, at least one of the adhesive layer, the elastic layer, and the self-healing layer may further include at least one of a UV blocking agent and an IR blocking agent.

According to an embodiment of the present invention, since the base layer of the protective film for the windshield of the vehicle is formed of an elastic material, the strength and hardness of the protective film for the windshield of the vehicle are relatively lowered, so that the protective film can be installed on the curved portion of the windshield of the vehicle without the thermoforming process, thereby improving the workability of the worker.

According to an embodiment of the present invention, since the self-healing layer is disposed on the elastic layer, which is the base layer, scratches that may occur on the surface of the protective film for the windshield of the vehicle can be healed, thereby protecting the surface of the windshield of the vehicle.

According to an embodiment of the present invention, the protective film for the windshield of the vehicle having elasticity can be implemented by using a urethane-based elastic layer and a urethane-based self-healing layer, so that the impact resistance of the protective film for the windshield of the vehicle can be improved, thereby protecting the windshield of the vehicle from the external impact, and maintaining the surface of the windshield by healing scratches caused by the wiper.

According to an embodiment of the present invention, the adhesion between the elastic layer and the adhesive layer can be improved by the adhesive layer of the protective film for the windshield of the vehicle, so that the surface treatment process is not required on the surface of the elastic layer, thereby reducing the cost of the film and preventing the transfer phenomenon of leaving the adhesive on the windshield of the vehicle when the film is removed.

According to an embodiment of the present invention, the adhesion between the self-healing layer, the elastic layer, and the adhesive layer can be improved by the primer layer, so that it is possible to prevent the phenomenon in which at least one of the self-healing layer, the elastic layer, and the adhesive layer remains on the windshield when the protective film for the windshield of the vehicle is removed.

According to an embodiment of the present invention, the UV blocking agent and the IR blocking agent are added to the primer layer without directly added to the self-healing layer, the elastic layer, and the adhesive layer, so that the durability of the protective film for the windshield of the vehicle can be improved by preventing the phenomenon of deterioration of properties that may occur when UV and IR blocking agents are added to the self-healing layer, the elastic layer, and the adhesive layer.

According to an embodiment of the present invention, at least one of a UV blocking agent and an IR blocking agent is included in the protective film for the windshield of the vehicle, so the skin aging can be prevented by protecting the driver's skin and the protective film can serve as a tinting film that reduces heat generation inside the vehicle.

DETAILED DESCRIPTION OF THE EMBODIMENTS

Figure 1:
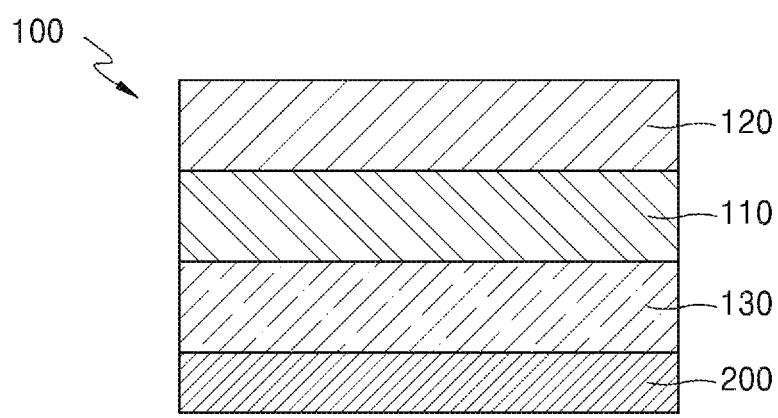
FIG. 1 is a schematic view showing a stack structure of a protective film for a windshield of a vehicle according to an embodiment of the present invention.

Hereinafter, various embodiments and/or aspects will be described with reference to the drawings. In the following description, a plurality of specific details are set forth to provide comprehensive understanding of one or more aspects for the purpose of explanation. However, it shall also be appreciated by those having ordinary skill in the art that such aspect(s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

The terms "embodiment", "example", "aspect", "illustration" or the like used herein may not be construed in that an aspect or design set forth herein is preferable or advantageous than other aspects or designs.

In addition, the term "or" is intended to mean inclusive "or", not exclusive "or". In other words, unless otherwise specified or if unclear in context, the expression "X uses A or B" is intended to mean one of the natural inclusive substitutions. In other words, when X uses A; X uses B; or X uses both A and B, the expression "X uses A or B" can be applied to either of these cases. It is also to be understood that the term "and/or" used herein refers to and includes all possible combinations of one or more of the listed related items.

In addition, the terms "include" and/or "including" specify the presence of the corresponding feature and/or element, but do not preclude the possibility of the presence or addition of one or more other features, elements or combinations thereof.

Further, it will be understood that singular expressions such as "one" and "the" may include plural expressions unless clearly indicate otherwise. Thus, as an example, a "component surface" may include one or more component surfaces.

In addition, the terms including an ordinal number such as first and second may be used to describe various elements, and the elements are not limited by the terms. The terms are used only for the purpose of distinguishing one element from another element. For example, the first element may be referred to as the second element without departing from the scope of the present invention, and similarly, the second element may also be referred to as the first element. The term "and/or" includes any one of a plurality of related listed items or a combination thereof.

In addition, terms used in the present specification are only to describe specific embodiments and are not intended to limit the present invention. Singular expressions include plural expressions unless the context clearly indicates otherwise. In the present specification, terms such as "comprise" or "have" are intended to designate the presence of features, numbers, steps, operations, components, parts, or combinations thereof described in the specification, but do not preclude the possibility of the presence or addition of one or more other features, numbers, steps, operations, components, parts, or combinations thereof.

In addition, unless otherwise defined in embodiments of the present invention, all terms used herein including technical or scientific terms have the same meaning as commonly understood by those having ordinary skill in the art. Terms such as those defined in generally used dictionaries shall be interpreted to have the meaning consistent with the meaning in the context of the related art, and should not be interpreted as an ideal or excessively formal meaning unless expressly defined in an embodiment of the present invention.

Structure of Protective Film 100 for Windshield of Vehicle

FIG. 1 is a schematic view showing a stack structure of a protective film 100 for a windshield of a vehicle according to an embodiment of the present invention.

The protective film 100 for the windshield of the vehicle according to an embodiment of the present invention may include an adhesive layer 130 including an acrylic copolymer, a curing agent, and a solvent; an elastic layer 110 disposed on the adhesive layer 130 and including a polyurethane acrylate oligomer, an acrylate monomer, and a photoinitiator; and a self-healing layer 120 disposed on the elastic layer 110, including a urethane resin and an isocyanate curing agent, and having a function of healing scratches with impact resistance.

The elastic layer 110 may have a thickness greater than that of the self-healing layer 120, and strength and hardness lower than those of a PET film. As the elastic layer 110 is laminated between the self-healing layer 120 and the adhesive layer 130, the protective film may be attached to a curved portion of the windshield of the vehicle without a thermoforming process by the elastic force of the elastic layer 110.

The PET film may be a film having a tensile strength of 160 MPa or more and a hardness of 2 H to 3 H.

The elastic layer according to an embodiment of the present invention may have a thickness in the range of 100 to 200 micrometers, the self-healing layer may have a thickness in the range of 20 to 40 micrometers, and the adhesive layer may have a thickness in the range of 5 to 15 micrometers.

As shown in FIG. 1, the protective film 100 for the windshield of the vehicle 100 may have a structure including the adhesive layer 130, the elastic layer 110 disposed on the adhesive layer 130, and the self-healing layer 120 disposed on the elastic layer 110.

According to an embodiment, the elastic layer 110 may include a polyurethane acrylate oligomer, an acrylate monomer, and a photoinitiator. Preferably, the elastic layer 110 according to an embodiment of the present invention may include 25 to 40 parts by weight of the polyurethane acrylate oligomer, 50 to 70 parts by weight of the acrylate monomer, and 0.1 to 5 parts by weight of the photoinitiator.

Regarding the constituent components of the elastic layer 110, the polyurethane acrylate oligomer may be a component that can impart flexibility to a base layer, and the photoinitiator may be a component that can impart rigidity to the base layer. According to an embodiment of the present invention, the elastic layer 110 may have a composition of 25 to 40 parts by weight of the polyurethane acrylate oligomer, 50 to 70 parts by weight of the acrylate monomer, and 0.1 to 5 parts by weight of the photoinitiator, so that the protective film may have optimum strength and hardness suitable to be attached to the curved portion of the windshield of the vehicle.

Preferably, as the elastic layer 110 includes the composition of 25 to 40 parts by weight of the polyurethane acrylate oligomer, 50 to 70 parts by weight of the acrylate monomer, and 0.1 to 5 parts by weight of the photoinitiator, the elastic layer 110 may have strength and hardness lower than those of the PET film having a tensile strength of 160 MPa or more and hardness of 2 H to 3 H.

That is, since the elastic layer 110 is formed of a combination of polymers having the above composition, the elastic layer 110 may have elasticity suitable to be attached to the curved portion of the windshield of the vehicle without the thermoforming process, and improved impact absorption property for protecting the windshield of the vehicle.

In particular, the elastic layer 110 may include the polyurethane acrylate oligomer and the acrylate monomer, so that the elastic layer 110 may implement the impact resistance, strength, hardness, and ductility required by the protective film for the windshield of the vehicle and may be attached without the thermoforming process. In the present invention, the elastic layer 110 having relatively low strength and hardness is provided through the above composition. In addition, the elastic layer having the above composition may be stably bonded with the self-healing layer to be described below.

In addition, according to an embodiment of the present invention, the elastic layer 110 may serve as a base layer of the protective film 100 for the windshield of the vehicle.

As described above, a typical protective film for a windshield of a vehicle includes a plastic film including PET or the like as a base layer. In this case, the base layer may have high strength and hardness, but a thermoforming process is essentially required when the protective film including the base layer is attached to the curved portion of the windshield of the vehicle, so it takes long time to install the protective film.

According to the present invention, in order to solve the above problem, the protective film 100 for the windshield of the vehicle may include the elastic layer 110 as a base layer, and the self-healing layer 120 described below to supplement the elastic layer, so that the protective film for the windshield of the vehicle may have the required properties and may be attached to the curved portion of the windshield of the vehicle without the thermoforming process.

As described above, a protective film including the elastic layer 110 having lower strength and hardness than the PET film may be implemented. The lower strength and hardness means that it deforms relatively well even at the room temperature without applying heat, and when the protective film having the lower strength and hardness is attached to the curved portion of the windshield of the vehicle, the thermoforming process may not be necessary. That is, when the protective film 100 for the windshield of the vehicle including the elastic layer 110 as a base layer is attached to the curved portion of the windshield of the vehicle, the thermoforming process is not required, so that the installation time can be relatively shortened.

Preferably, since the base layer of the protective film 100 for the windshield of the vehicle is formed of an elastic material, the strength and hardness of the protective film 100 for the windshield of the vehicle are relatively lowered so that the protective film 100 maybe installed on the curved portion of the windshield of the vehicle without the thermoforming process, thereby improving the workability of the worker.

Meanwhile, in an embodiment of the present invention, the self-healing layer 120 may include a urethane resin, and an isocyanate curing agent. Preferably, the self-healing layer 120 according to an embodiment of the present invention may include 100 parts by weight of the urethane resin, and 30 to 50 parts by weight of the isocyanate curing agent.

Regarding the constituent components of the self-healing layer 120, a mixture of the urethane resin and the isocyanate curing agent may be a component capable of implementing the self-healing function. According to an embodiment of the present invention, the self-healing layer 120 may include the composition including 100 parts by weight of the urethane resin and 30 to 50 parts by weight of the isocyanate curing agent, so it is possible to implement a self-healing function suitable for self-healing the scratches formed on the surface of the windshield of the vehicle.

That is, the self-healing layer 120 may be formed of a combination of polymers having the above composition, so the self-healing layer 120 may have an optimal self-healing ability suitable for maintaining the surface of the windshield of the vehicle, and improved impact absorption function for protecting the windshield of the vehicle. In addition, the self-healing layer 120 having the above composition may supplement the role of the elastic layer 110 so that the stack structure as a whole may satisfy the characteristics required as a protective film for the windshield of the vehicle.

In addition, according to an embodiment of the present invention, the self-healing layer 120 may be disposed on the elastic layer 110, which is the base layer of the protective film 100 for the windshield of the vehicle, to maintain the surface of the windshield of the vehicle. As described above, a typical protective film for the windshield of the vehicle includes a PET layer as a base layer, and is manufactured by performing hard coating on the upper surface of the base layer. In this case, it has an excellent function of preventing scratches that may occur on the surface of the windshield of the vehicle due to the hard coating. However, since the hard coating has a very low impact absorption capacity, there is a problem in protecting the windshield of the vehicle to be protected by the film.

In order to solve the above problem, according to the present invention, the self-healing layer 120 may be disposed on the elastic layer 110, which is the base layer, so that the scratches that may occur on the surface of the windshield of the vehicle can be self-healed and the surface can be stably maintained. That is, the self-healing layer 120 may stably replace the existing hard coating layer and have excellent impact absorption function so that the protective film including the self-healing layer 120 capable of effectively protecting the windshield of the vehicle may be implemented. Preferably, since the self-healing layer 120 may be disposed on the elastic layer 110, which is a base layer, the scratches that may occur on the surface of the protective film 100 for the windshield of the vehicle may be healed so that the surface of the windshield of the vehicle can be protected.

As described above, according to an embodiment of the present invention, the elastic layer 110 provided as a base layer, and the self-healing layer 120 disposed on the elastic layer 110 may be formed by using similar materials as the main component.

Preferably, the elastic layer may include a polyurethane acrylate oligomer, and the self-healing layer may include a urethane resin, so that adhesion, impact resistance, and processability may be significantly improved.

For this reason, adhesion between the elastic layer 110 and the self-healing layer 120 may be improved. In addition, according to an embodiment of the present invention, the elastic layer 110 can also partially heal pressed marks, so the elastic layer 110 may assist the self-healing function of the self-healing layer 120 for the scratches. Preferably, the elastic protective film 100 for the windshield of the vehicle may be implemented by the urethane-based elastic layer 110 and the urethane-based self-healing layer 120, so that the impact resistance of the protective film 100 for the windshield of the vehicle may be improved, thereby protecting the windshield of the vehicle from the external impact and the scratches caused by the wiper may be healed, thereby maintaining the surface of the windshield.

In addition, since the protective film 100 for the windshield of the vehicle according to an embodiment of the present invention includes the elastic layer 110 and the self-healing layer 120 formed of a urethane-based elastic material, the protective film may have relatively low strength and hardness. Accordingly, the protective film 100 for the windshield of the vehicle including the elastic layer 110 and the self-healing layer 120 does not require the thermoforming process when it is attached to the curved portion of the windshield of the vehicle, so the workability of the worker can be improved.

Meanwhile, as described above, the protective film including the PET layer as a base layer has excellent transmittance so that excellent visibility can be ensured. For this reason, the protective film including the PET layer as the base layer is relatively widely used despite the necessity of the thermoforming process.

In this regard, the protective film 100 for the windshield of the vehicle according to an embodiment of the present invention replaces the existing PET layer with the elastic layer 110 having the composition as described above, and the self-healing layer 120 having the above-described composition is formed on the elastic layer 110, thereby ensuring excellent visibility and enabling the installation without the need for the thermoforming process.

With regard to the features such as ensuring of visibility, the protective film 100 for the windshield of the vehicle according to an embodiment of the present invention may be configured such that the layers constituting the protective film 100 for the windshield of the vehicle have predetermined thicknesses in order to secure the visibility for the safety of the driver, and to secure the self-healing function and impact absorption function.

Regarding the predetermined thickness, according to an embodiment of the present invention, the elastic layer 110 may have the thickness in the range of 100 to 200 micrometers, and the self-healing layer 120 may have the thickness in the range of be 20 to 40 micrometers. In such a thickness range, the visibility that can be ensured when the protective film 100 for the windshield of the vehicle is attached to the windshield of the vehicle can be achieved, and at the same time, the self-healing function and impact absorption function of the protective film 100 for the windshield of the vehicle can be implemented.

That is, since the protective film 100 for the windshield of the vehicle according to an embodiment of the present invention includes the elastic layer 110 and the self-healing layer 120 having the predetermined thickness, excellent visibility, self-healing function and impact absorption function can be secured.

Meanwhile, according to an embodiment of the present invention, the adhesive layer 130 may include an acrylic copolymer, a curing agent, and a solvent. Preferably, the adhesive layer 130 according to an embodiment of the present invention may include 100 parts by weight of the acrylic copolymer, 0.1 to 5 parts by weight of the curing agent, and 90 to 110 parts by weight of the solvent. In general, a method capable of improving the adhesion between the base layer and each layer disposed on upper and lower surfaces of the base layer is used by performing a surface treatment process such as corona treatment or primer treatment on the surface of the base layer. However, if a material having elasticity is used as the base layer, the surface treatment process cannot be performed on the surface of the base layer, so an additional process is required. In order to solve the above problem, according to the present invention, the adhesive layer 130 may have the above-described composition so that high adhesion between the adhesive layer 130 and the elastic layer 110, which is the base layer, can be achieved without a separate surface treatment process.

Regarding the constituent composition of the adhesive layer 130, the acrylic copolymer may be a component capable of imparting adhesive force to the adhesive layer 130, and the solvent may be a component for evenly mixing the components constituting the adhesive layer 130. According to an embodiment of the present invention, the adhesive layer 130 may include a composition of 100 parts by weight of the acrylic copolymer, 0.1 to 5 parts by weight of the curing agent, and 90 to 110 parts by weight of the solvent, so that the adhesive layer 130 may be suitable for improving the adhesion with respect to the elastic layer 110. However, the components constituting the adhesive layer 130 may have variable characteristics expressed according to their composition, and the characteristics may include viscosity, adhesion, and the like. According to the present invention, the adhesive layer 130 capable of improving the adhesion with respect to the elastic layer 110 may be formed through the above composition.

In addition, according to an embodiment of the present invention, as the adhesion between the adhesive layer 130 and the elastic layer 110 is improved, it is possible to prevent the transfer phenomenon of leaving the adhesive on the windshield of the vehicle when the protective film 100 for the windshield of the vehicle is removed. Preferably, the adhesion between the elastic layer 110 and the adhesive layer 130 can be improved by the adhesive layer 130 of the protective film 100 for the windshield of the vehicle, so that the unit cost of the film may be lowered because the surface treatment is not required on the surface of the film, and it is possible to prevent the transfer phenomenon of leaving the adhesive on the windshield of the vehicle when the film is removed.

In addition, the adhesive layer 130 may have a predetermined thickness. Preferably, the adhesive layer 130 may have a thickness of 5 to 15 micrometers. Since the protective film 100 for the windshield of the vehicle includes the adhesive layer 130 having the above composition, the thickness may be optimally set in consideration of characteristics for improving the adhesion between the elastic layer 110 and the adhesive layer 130. That is, since the protective film 100 for the windshield of the vehicle according to an embodiment of the present invention includes the adhesive layer 130 having the predetermined thickness, the adhesion between the elastic layer 110 and the adhesive layer 130 may be improved so that it is possible to ensure the adhesion sufficient to prevent the transfer phenomenon of leaving the adhesive on the windshield of the vehicle when the film is removed.

Meanwhile, as shown in FIG. 1, the protective film 100 for the windshield of the vehicle may further include a release film 200 disposed under the adhesive layer 130.

According to an embodiment of the present invention, the release film 200 may be disposed under the adhesive layer 130 to protect the adhesive layer 130 until the protective film 100 for the windshield of the vehicle is attached to the windshield of the vehicle. In addition, it is preferred that the release film 200 has a low adhesive strength because the release film 200 needs to be simply removed by a worker when it is attached to the windshield of the vehicle. According to an embodiment of the present invention, the release film 200 may include various types of release films 200 that have a low adhesive strength and are difficult to increase the adhesive strength even when time has elapsed in a state in which the release film 200 is attached to the adhesive layer 130.

Figure 2:
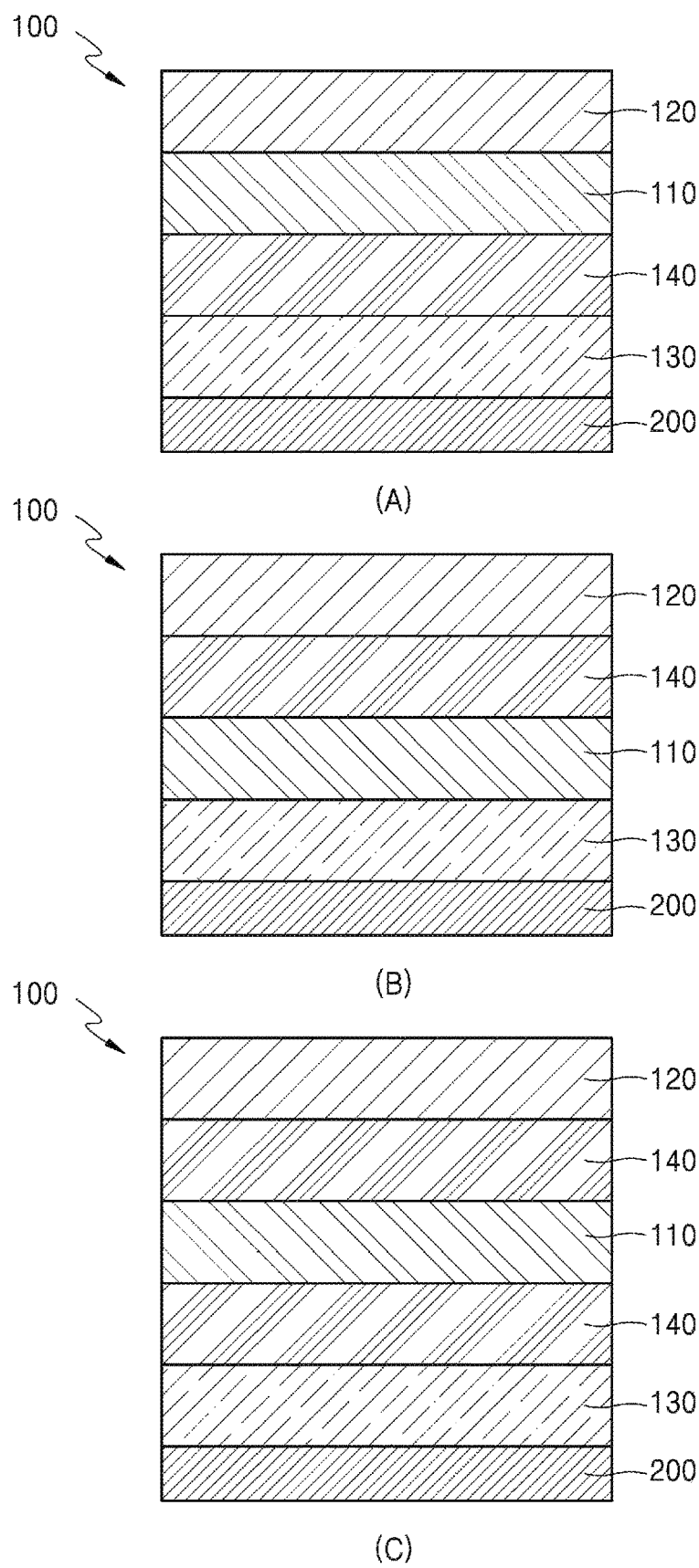
FIG. 2 is a schematic view showing a stack structure of a protective film for a windshield of a vehicle according to some embodiments of the present invention.

FIG. 2 is a schematic view showing the protective film for the windshield of the vehicle including a primer layer 140 according to an embodiment of the present invention.

The protective film 100 for the windshield of the vehicle according to an embodiment of the present invention may further include the primer layer 140 formed at one or more positions between the elastic layer 110 and the self-healing layer 120, and between the elastic layer 110 and the adhesive layer 130 and may include a urethane resin and an isocyanate curing agent.

According to one embodiment of the present invention, the primer layer 140 may include a urethane resin and an isocyanate curing agent. Preferably, the primer layer 140 according to an embodiment of the present invention may include 100 parts by weight of the urethane resin, and 1 to 10 parts by weight of the isocyanate curing agent. Regarding the constituent components of the primer layer 140, the mixture of the urethane resin and the isocyanate curing agent may be composed of a urethane-based component similar to the constituent component of the elastic layer 110 for improving the adhesion to urethane-based layers. According to an embodiment of the present invention, since the primer layer 140 includes a composition of 100 parts by weight of the urethane resin and 1 to 10 parts by weight of the isocyanate curing agent, the primer layer 140 may have the optimal adhesion performance suitable for improving the adhesion between the self-healing layer 120, the elastic layer 110, and the adhesive layer 130 that constitute the protective film 100 for the windshield of the vehicle.

That is, the primer layer 140 may improve the adhesion between the layers constituting the protective film 100 for the windshield of the vehicle because the primer layer 140 includes the above composition. However, the components constituting the primer layer 140 may have variable characteristics expressed according to the composition thereof, and the characteristics may include impact resistance, strength, hardness, and ductility. According to the present invention, the primer layer 140 capable of improving the adhesion between the layers constituting the protective film 100 for the windshield of the vehicle has been formed through the above composition.

In addition, according to an embodiment of the present invention, the primer layer 140 may be disposed at one or positions between the elastic layer 110 and the self-healing layer 120, and between the elastic layer 110 and the adhesive layer 130. As shown in FIG. 2, the protective film 100 for the windshield of the vehicle may have the structure including the adhesive layer 130, the elastic layer 110 disposed on the adhesive layer 130, and the elastic layer 110 disposed on the self-healing layer 120, and at least one primer layer 140 may be disposed between the layers.

In addition, the primer layer 140 may have a predetermined thickness. Preferably, the primer layer 140 may have a thickness of 1 micrometer or less. Since the protective film 100 for the windshield of the vehicle includes the primer layer 140, the thickness may be optimized and set in consideration of the characteristics that can improve the adhesion with respect to the elastic layer 110, the self-healing layer 120, and the adhesive layer 130.

That is, since the protective film 100 for the windshield of the vehicle according to an embodiment of the present invention includes the primer layer 140 having a predetermined thickness, excellent adhesion may be ensured due to the primer layer 140 disposed between the layers.

FIG. 2(A) is a schematic view showing the protective film 100 for the windshield of the vehicle including the primer layer 140 between the elastic layer 110 and the adhesive layer 130. As described above, the primer layer 140 may improve the adhesion between the layers constituting the protective film 100 for the windshield of the vehicle. Accordingly, the primer layer 140 may be disposed between the elastic layer 110 and the adhesive layer 130 to improve the adhesion between the elastic layer 110 and the adhesive layer 130, thereby preventing the transfer phenomenon of leaving a part or all of one or more layers constituting the protective film 100 for the windshield of the vehicle when the protective film 100 for the windshield of the vehicle is removed.

FIG. 2(B) is a schematic view showing the protective film 100 for the windshield of the vehicle including the primer layer 140 between the elastic layer 110 and the self-healing layer 120. As described above, the primer layer 140 may improve the adhesion between the layers constituting the protective film 100 for the windshield of the vehicle. Accordingly, the primer layer 140 may be disposed between the elastic layer 110 and the self-healing layer 120 to improve the adhesion between the elastic layer 110 and the self-healing layer 120, thereby preventing the transfer phenomenon of leaving a part or all of one or more layers constituting the protective film 100 for the windshield of the vehicle when the protective film 100 for the windshield of the vehicle is removed.

FIG. 2(C) is a schematic view showing the protective film 100 for the windshield of the vehicle including the primer layer 140 between the elastic layer 110 and the adhesive layer 130, and between the elastic layer 110 and the self-healing layer 120. As described above, the primer layer 140 may improve the adhesion between the layers constituting the protective film 100 for the windshield of the vehicle. Accordingly, the primer layer 140 may be disposed between the elastic layer 110 and the adhesive layer 130, and between the elastic layer 110 and the self-healing layer 120 so that the adhesion between the elastic layer 110 and the adhesive layer 130 and between the elastic layer 110 and the self-healing layer 120 may be improved, thereby preventing the transfer phenomenon of leaving a part or all of one or more layers constituting the protective film 100 for the windshield of the vehicle when the protective film 100 for the windshield of the vehicle is removed. Preferably, the adhesion between the self-healing layer 120, the elastic layer 110, and the adhesive layer 130 may be improved by the primer layer 140, so that it is possible to prevent at least one of the self-healing layer 120, the elastic layer 110, and the adhesive layer 130 from remaining on the windshield when the protective film 100 for the windshield of the vehicle is removed.

According to an embodiment of the present invention, the primer layer 140 may further include at least one of a UV blocking agent and an IR blocking agent.

According to an embodiment of the present invention, at least one of the adhesive layer 130, the elastic layer 110, and the self-healing layer 120 may further include at least one of a UV blocking agent and an IR blocking agent.

The protective film 100 for the windshield of the vehicle according to an embodiment of the present invention may include at least one of the UV blocking agent for blocking ultraviolet rays and the IR blocking agent for blocking infrared rays. In general, a protective film for the windshield of the vehicle may serve to protect the windshield of the vehicle, and at the same time, to block ultraviolet rays and infrared rays in order to protect the skin of a driver and suppress an increase in temperature inside the vehicle.

According to an embodiment of the present invention, at least one of the UV blocking agent and the IR blocking agent may be added to the primer layer 140. Preferably, the primer layer 140 constituting the protective film 100 for the windshield of the vehicle may further include at least one of the UV blocking agent and the IR blocking agent. More preferably, the primer layer 140 constituting the protective film 100 for the windshield of the vehicle may further include at least one of 1 to 10 parts by weight of the UV blocking agent and 1 to 10 parts by weight of the IR blocking agent. For example, the protective film 100 for the windshield of the vehicle may include the primer layer 140 including the IR blocking agent, include the primer layer 140 including the UV blocking agent, or include the primer layer 140 including the IR blocking agent and the UV blocking agent.

According to one embodiment of the present invention, at least one of the UV blocking agent and the IR blocking agent may be added to at least one of the adhesive layer 130, the elastic layer 110, and the self-healing layer 120. Preferably, at least one of the adhesive layer 130, the elastic layer 110, and the self-healing layer 120 constituting the protective film 100 for the windshield of the vehicle may include at least one of the UV blocking agent and the IR blocking agent. More preferably, at least one of the adhesive layer 130, the elastic layer 110, and the self-healing layer 120 constituting the protective film 100 for the windshield of the vehicle may include at least one of 1 to 10 parts by weight of the UV blocking agent and 1 to 10 parts by weight of the IR blocking agent.

However, when at least one of the UV blocking agent and the IR blocking agent is added to at least one of the adhesive layer 130, the elastic layer 110, and the self-healing layer 120, the physical properties including the adhesion, transmittance, elasticity, and self-healing properties may deteriorate.

More specifically, when the UV blocking agent or the IR blocking agent is added to the adhesive layer 130, the elastic layer 110, or the self-healing layer 120, the IR and UV blocking effects may become weaker as time elapses or there is a problem that durability and transmittance of the self-healing layer 120 and the elastic layer 110 may be reduced.

Therefore, when higher durability is required in some embodiments of the present invention, it is more preferred to add at least one of the IR blocking agent and the UV blocking agent to the primer layer 140.

This is because at least one of the UV blocking agent and the IR blocking agent is not directly added to the self-healing layer 120, the elastic layer 110, and the adhesive layer 130, but added to the primer layer 140, so the durability of the protective film 100 for the windshield of the vehicle can be improved by preventing the deterioration of the physical properties that may happen when the UV blocking agent and the IR blocking agent are added to self-healing layer 120, the elastic layer 110, and the adhesive layer 130. In this manner, the UV blocking agent and the IR blocking agent may be included in the protective film 100 for the windshield of the vehicle, thereby preventing skin aging by protecting the skin of the driver and acting as a tinting film that reduces heat generation inside the vehicle.

As described above, the protective film 100 for the windshield of the vehicle according to an embodiment of the present invention may include the urethane-based elastic layer 110 and the urethane-based self-healing layer 120, so that It is possible to improve the workability of a worker by installing the protective film 100 for the windshield of the vehicle on the curved portion of the windshield in a relatively short time without the thermoforming process. In addition, since the protective film 100 for the windshield of the vehicle according to an embodiment of the present invention has elasticity, the protective film 100 has excellent impact resistance so that it can protect the windshield of the vehicle from external impacts and heal the scratches that may be generated by the wiper. Further, since the protective film 100 for the windshield of the vehicle according to an embodiment of the present invention represents relatively low change in physical properties in association with the climate and ultraviolet rays, the protective film 100 for the windshield of the vehicle may have the excellent durability. In addition, the protective film 100 for the windshield of the vehicle according to an embodiment of the present invention may include at least one of the UV blocking agent and the IR blocking agent to block the ultraviolet rays and infrared rays, thereby preventing the skin aging by protecting the skin of the driver and acting as a tinting film that reduces heat generation inside the vehicle. Further, according to an embodiment of the present invention, the protective film 100 for the windshield of the vehicle may have an impact resistance characteristic of 2000 mJ to 3000 mJ based on a Du pont impact test.

Hereinafter, examples according to the present invention and a plurality of comparative examples will be described. In addition, the result of performing a characteristic test in association with the comparative examples and the above examples will be described in detail.

EXAMPLE 1

An elastic layer 110 including 35 parts by weight of a polyurethane acrylate oligomer, 63 parts by weight of an acrylate monomer, and 0.9 parts by weight of a photoinitiator was formed with a thickness of 150 micrometers, a self-healing layer 120 including 100 parts by weight of a urethane resin and 40 parts by weight of an isocyanate curing agent was formed with a thickness of 25 micrometers on an upper surface of the elastic layer 110 through a primary coating, and an adhesive layer 130 including 100 parts by weight of an acrylic copolymer, 2 parts by weight of a curing agent, and 115 parts by weight of a solvent was formed with a thickness of 7 micrometers on a lower surface of the elastic layer 110 through a secondary coating, thereby preparing a protective film 100 for a windshield of a vehicle that does not require a thermoforming process. That is, Example 1 may have a stack structure the same as the stack structure show in FIG. 1 described above.

COMPARATIVE EXAMPLE 1

A corona-treated PET film was formed with a thickness of 75 micrometers as a base layer, a self-healing layer including 100 parts by weight of a urethane resin and 40 parts by weight of an isocyanate curing agent was formed with a thickness of 25 micrometers on an upper surface of the base layer through a primary coating, and an adhesive layer including 100 parts by weight of an acrylic copolymer, 2 parts by weight of a curing agent, and 115 parts by weight of a solvent was formed with a thickness of 7 micrometers on a lower surface of the elastic layer through a secondary coating.

COMPARATIVE EXAMPLE 2

As a protective film product for a windshield available from LINTEC, the protective film product was analyzed as it includes a base layer including a PET film having a thickness of 75 micrometer, a hard coating layer having a thickness of 15 micrometers on an upper surface of the base layer, and an acrylic adhesive layer having a thickness of 10 micrometers on a lower surface of the base layer.

COMPARATIVE EXAMPLE 3

As a protective film product for a windshield available from SANGBO, the protective film product was analyzed as it includes a base layer including a PET film having a thickness of 75 micrometer, a hard coating layer having a thickness of 3 micrometers on an upper surface of the base layer, and an acrylic adhesive layer having a thickness of 20 micrometers on a lower surface of the base layer.

Experiment Result for Comparison of Protective Film Characteristics #1

Table 1 is the result of measuring the time required to attach the protective films of Example 1 according to the present invention and Comparative Examples 1 to 3 to the curved portion of the windshield of the vehicle.

TABLE 1

| Protective film | Installation completion time (minutes) |
| --- | --- |
| Example 1 | 20 |
| Comparative Example 1 | 80 |
| Comparative Example 2 | 110 |
| Comparative Example 3 | 120 |

As shown in Table 1, it took 20 minutes to attach Example 1 of the present invention to the curved portion of the windshield of the vehicle, it took 80 minutes to attach Comparative Example 1 to the curved portion of the windshield of the vehicle, It took 110 minutes to attach Comparative Example 2 to the curved portion of the windshield of the vehicle, and it took 120 minutes to attach Comparative Example 3 to the curved portion of the windshield of the vehicle.

That is, since Example 1 can be attached to the curved portion of the windshield of the vehicle without the thermoforming process, the installation work can be completed within a very short time. Meanwhile, the product of Comparative Example 1 was relatively soft, so the product was attached to the curved portion of the windshield of the vehicle while applying heat a little and the products of Comparative Examples 2 and 3 were relatively hard, so the products were attached to the curved portion of the windshield of the vehicle while applying a lot of heat, so it took relatively long time for installation. Accordingly, it was confirmed that it has excellent workability when the protective film 100 for the windshield of the vehicle according to an embodiment of the present invention is attached to the curved portion of the windshield of the vehicle.

Figure 3:
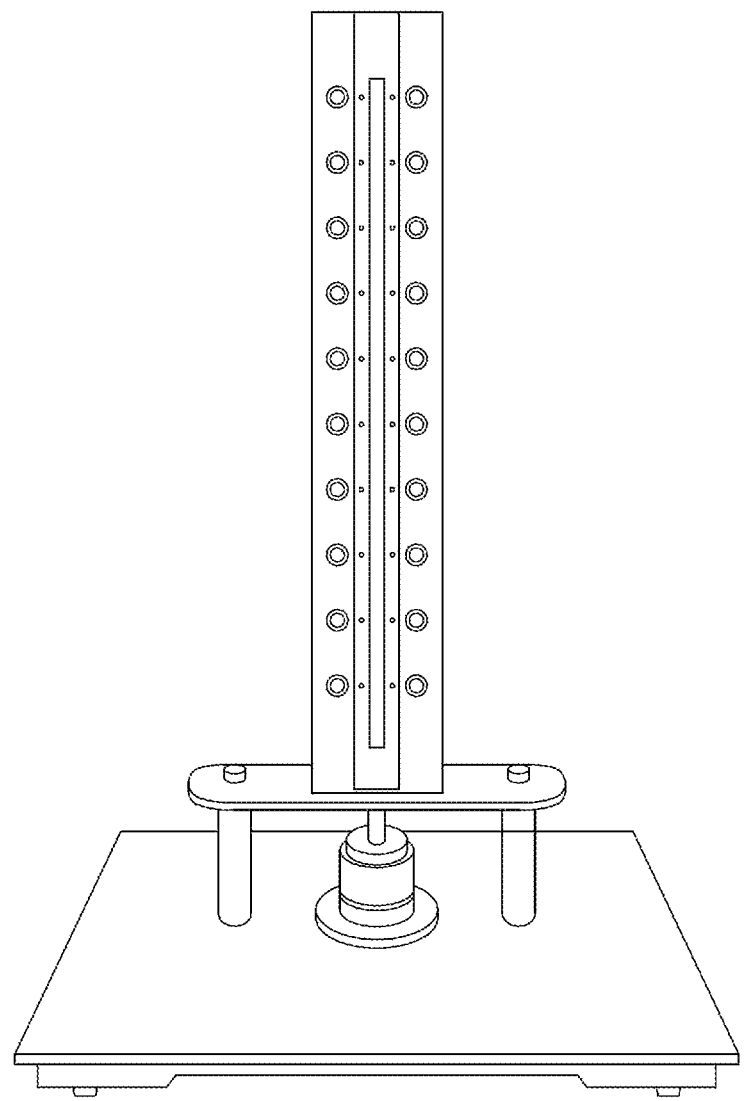
FIG. 3 is a schematic view showing an example of an impact resistance tester for measuring impact resistance characteristics of Examples of a protective film for a windshield of a vehicle according to an embodiment of the present invention and Comparative Examples.

FIG. 3 is a schematic view showing an example of an impact resistance tester for measuring impact resistance characteristics of Examples of a protective film 100 for a windshield of a vehicle according to an embodiment of the present invention and Comparative Examples. Preferably, the impact resistance of the protective film 100 for the windshield of the vehicle was measured by using Du pont impact test equipment shown in FIG. 3. In the Du pont impact test, energy was measured at the point where glass was not broken through the calculation of the potential energy value by confirming the condition of breaking the glass when an impact is applied on the protective film in a state in which the protective film 100 for the windshield of the vehicle was attached to the same glass. The potential energy is composed of the product of a weight (g) of a pendulum, an acceleration of gravity (9.8 m/sec$^2$), and a height (m), and when the measured potential energy value is high, it means that the glass is broken as an impact is applied from a higher height and it means that the impact absorption is well achieved.

Figure 4:
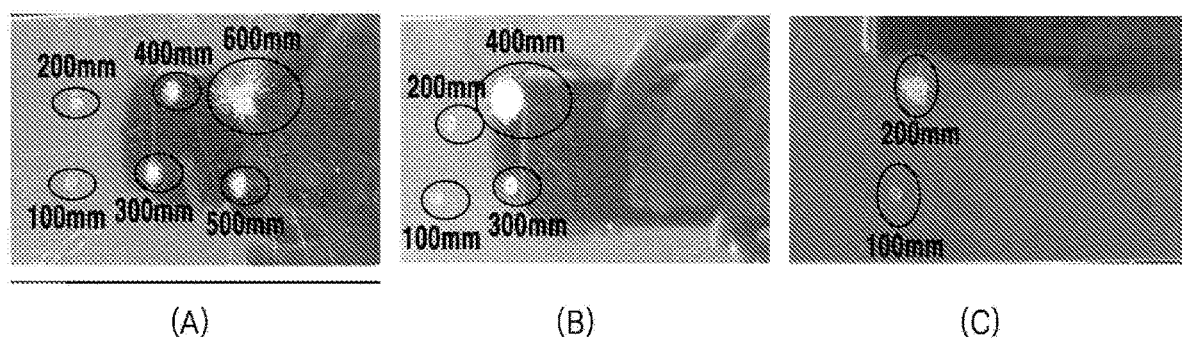
FIG. 4 is a schematic view showing the impact resistance test results of Examples of a protective film for a windshield of a vehicle according to an embodiment of the present invention and Comparative Examples.

Table 2 shows the potential energy value measured through the impact resistance test of the Example according to the present invention and Comparative Examples 1 to 3 measured by the tester shown in FIG. 3, and FIG. 4 is a schematic view showing the impact resistance test results of Examples of the protective film 100 for the windshield of the vehicle according to an embodiment of the present invention and Comparative Examples.

TABLE 2

| Protective film | Maximum potential energy (mJ) |
| --- | --- |
| Example 1 | 2450 |
| Comparative Example 1 | 1470 |
| Comparative Example 2 | 490 |
| Comparative Example 3 | 490 |

As shown in Table 2, the potential energy value of Example 1 is 2450 mJ, the potential energy value of Comparative Example 1 is 1470 mJ, the potential energy value of Comparative Example 2 is 490 mJ, and the potential energy value of Comparative Example 3 is 490 mJ. This can also be confirmed in FIG. 4. FIG. 4(A) shows a film surface after the impact resistance test of Example 1, and it can be seen that the glass was broken when an impact is applied at a height of 600 mm from the surface of the protective film. FIG. 4(B) shows a film surface after the impact resistance test of Comparative Example 1, and it can be seen that the glass was broken when an impact is applied at a height of 400 mm from the surface of the protective film. FIG. 4(C) shows a film surface after the impact resistance test of Comparative Example 3, and it can be seen that the glass was broken when an impact is applied at a height of 200 mm from the surface of the protective film.

That is, Example 1 according to the present invention recorded the highest potential energy value, and Comparative Examples 1 to 3 recorded relatively low potential energy values. Accordingly, it was confirmed that the protective film 100 for the windshield of the vehicle according to an embodiment of the present invention has superior impact absorption function than that of a conventional PET base film.

Figure 5:
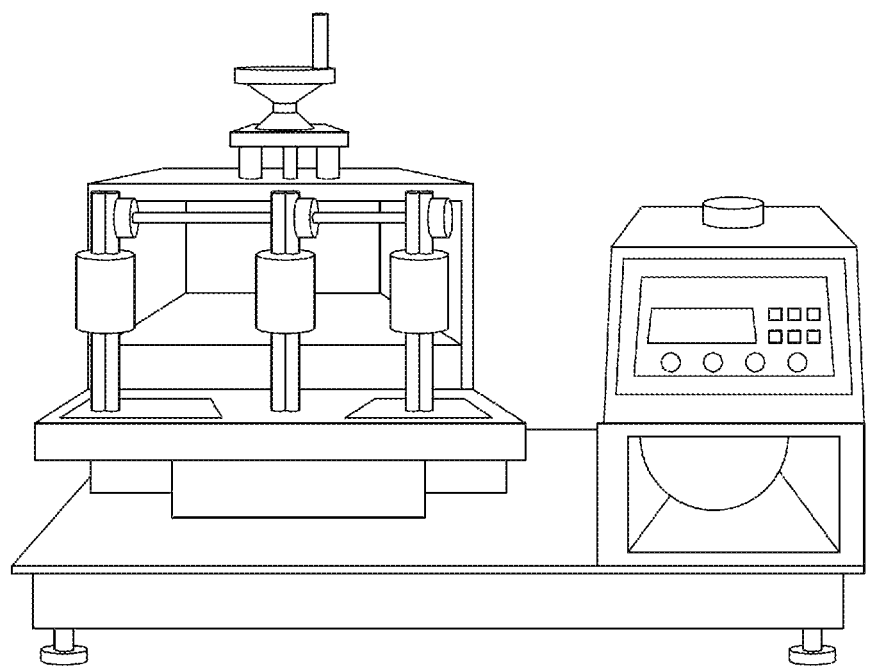
FIG. 5 is a schematic view showing a scratch tester for measuring scratch characteristics of Examples of a protective film for a windshield of a vehicle according to an embodiment of the present invention and Comparative Examples.

FIG. 5 is a schematic view showing a scratch tester for measuring scratch characteristics of Examples of a protective film 100 for a windshield of a vehicle according to an embodiment of the present invention and Comparative Examples. Preferably, the scratch characteristics of the protective film 100 for the windshield of the vehicle were measured by using Rubbing test equipment shown in FIG. 5. In the Rubbing test, steel wool (#0000) reciprocated on the surface of the protective film 100 for the windshield of the vehicle by 500 times with 80 rpm, and the occurrence of scratches on the surface was confirmed.

Figure 6:
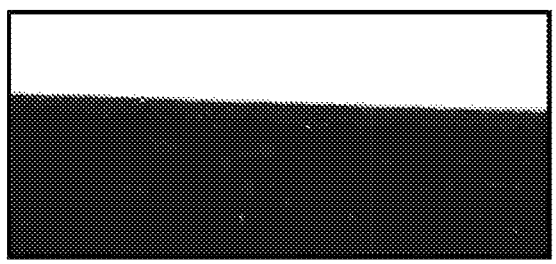
FIG. 6 is a schematic view showing the scratch test results of Examples of a protective film for a windshield of a vehicle according to an embodiment of the present invention and Comparative Examples.
Figure 6:
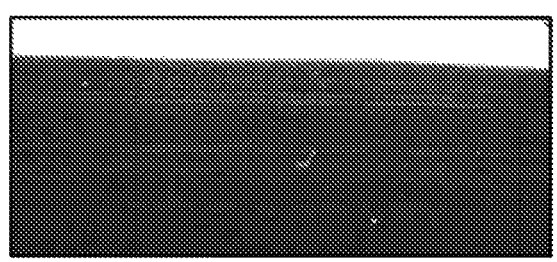
Figure 6:
Figure 6:
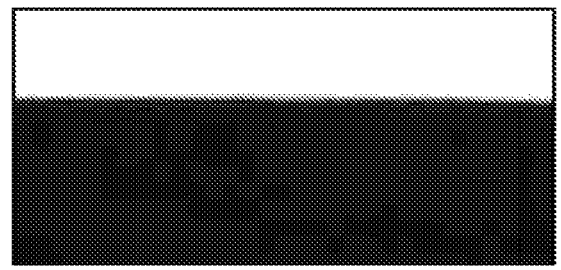

Table 3 shows the measurement results of the scratch test for the Example of the present invention and Comparative Examples 1 to 3 measured by the tester shown in FIG. 5, and FIG. 6 is a schematic view showing the scratch test results of Examples of a protective film 100 for a windshield of a vehicle according to an embodiment of the present invention and Comparative Examples.

TABLE 3

| Protective film | Surface condition after test |
| --- | --- |
| Example 1 | Full restoration |
| Comparative Example 1 | Partial restoration |
| Comparative Example 2 | Scratch occurrence X |
| Comparative Example 3 | Scratch occurrence X |

As shown in Table 3, scratches were occurred in Example 1, but all scratches were healed by the self-healing layer 120, and scratches were occurred in Comparative Example 1, but some of the scratches were healed while leaving scratches that do not disappear even after time. In addition, since Comparative Examples 2 and 3 are protective films of a hard coating type, no scratches were occurred. This can also be confirmed in FIG. 6. FIG. 6(A) shows a film surface after the scratch test of Example 1, and it can be seen that there is no scratch. FIG. 6(B) shows a film surface after the scratch test of Comparative Example 1, and it can be seen that some scratches remain. FIG. 6(C) shows a film surface after the scratch test of Comparative Example 2, and FIG. 6(D) shows a film surface after the scratch test of Comparative Example 3, and it can be seen that there is no scratch.

Therefore, it was confirmed that the protective film 100 for the windshield of the vehicle according to an embodiment of the present invention can maintain the surface the same as the surface of the protective film of a hard coating type.

Table 4 shows the results of measuring durability characteristics of the Example according to the present invention and Comparative Examples 1 to 3. Preferably, the film was irradiated with the same amount of UV light to measure the Yellowing index through a colorimeter, and the durability of the film was measured based on the variation of the measured value. In the colorimeter, as the b* value decreases, it is close to blue color, and as the b* value increases, it is close to yellow color. That is, as the variation of the b* value is larger, it may mean that the yellowing occurred after irradiation with UV light. The occurrence of yellowing in the film may mean that the molecular structure in the film is destroyed and the physical properties are deteriorated, resulting in poor durability.

TABLE 4

| Protective film | variation of b* value |
| --- | --- |
| Example 1 | 0.93 |
| Comparative Example 1 | 0.97 |
| Comparative Example 2 | 1.60 |
| Comparative Example 3 | 1.49 |

As shown in Table 4, the variation of the b* value of Example 1 is 0.93, the variation of the b* value of Comparative Example 1 is 0.97, the variation of the b* value of Comparative Example 2 is 1.60, and the variation of the b* value of Comparative Example 3 is 1.49. That is, Example 1 and Comparative Example 1 have a relatively low variation of the b* value, and Comparative Examples 2 and 3 have a relatively high variation of the b* value.

Therefore, it can be seen that the durability of the film is rapidly reduced when the hard-coated protective film 100 for the windshield of the vehicle is continuously exposed to ultraviolet rays. In addition, it was confirmed that the durability of the protective film 100 for the windshield of the vehicle according to an embodiment of the present invention is relatively excellent.

Table 5 is the results of comparing the UV blocking rate and IR blocking rate of the Example according to the present invention and Comparative Examples 1 to 3. Preferably, the UV blocking rate and IR blocking rate were measured by using a light transmittance meter.

TABLE 5

| Protective film | UV blocking rate/IR blocking rate (%/%) |
| --- | --- |
| Example 1 | 22.1/18.4 |
| Comparative Example 1 | 22.7/18.1 |
| Comparative Example 2 | 20.4/17.8 |
| Comparative Example 3 | 19.9/18.0 |

As shown in Table 5, the UV blocking rate and IR blocking rate of Example 1 were 22.1% and 18.4%, respectively, the UV blocking rate and IR blocking rate of Comparative Example 1 were 22.7% and 18.1%, respectively, the UV blocking rate and IR blocking rate of Comparative Example 2 were 20.4% and 17.8%, respectively, and the UV blocking rate and IR blocking rate of Comparative Example 3 were 19.9% and 18.0%, respectively.

Therefore, it was confirmed that the UV blocking rate and the IR blocking rate of the protective film 100 for the windshield of the vehicle according to an embodiment of the present invention are similar to or relatively higher than those of the conventional PET base film.

Hereinafter, Example 1 and Examples 2 to 4 including the primer layer 140 according to the present invention will be described. In addition, the result of performing the characteristic test in Examples 1 to 4 will be described.

EXAMPLE 2

An elastic layer 110 including 35 parts by weight of a polyurethane acrylate oligomer, 63 parts by weight of an acrylate monomer, and 0.9 parts by weight of a photoinitiator was formed with a thickness of 150 micrometers, a self-healing layer 120 including 100 parts by weight of a urethane resin and 40 parts by weight of an isocyanate curing agent was formed with a thickness of 25 micrometers on an upper surface of the elastic layer 110 through a primary coating, a primer layer 140 including 100 parts by weight of a urethane resin and 8 parts by weight of an isocyanate curing agent was formed with a thickness of 1 micrometer on a lower surface of the elastic layer 110, and an adhesive layer 130 including 100 parts by weight of an acrylic copolymer, 2 parts by weight of a curing agent, and 115 parts by weight of a solvent was formed with a thickness of 7 micrometers on a lower surface of the primer layer 140, thereby preparing a protective film 100 for a windshield of a vehicle that does not require a thermoforming process. That is, based on the structure and components of the protective film 100 for the windshield of the vehicle according to Example 1, the primer layer 140 was prepared between the elastic layer 110 and the adhesive layer 130, and the protective film 100 may have the structure the same as the structure shown in FIG. 2(A) described above.

EXAMPLE 3

An elastic layer 110 including 35 parts by weight of a polyurethane acrylate oligomer, 63 parts by weight of an acrylate monomer, and 0.9 parts by weight of a photoinitiator was formed with a thickness of 150 micrometers, a self-healing layer 120 including 100 parts by weight of a urethane resin and 40 parts by weight of an isocyanate curing agent was formed with a thickness of 25 micrometers on an upper surface of the elastic layer 110 through a primary coating, a primer layer 140 including 100 parts by weight of a urethane resin, 8 parts by weight of an isocyanate curing agent, 5 parts by weight of a UV blocking agent, and 7 parts by weight of an IR blocking agent was formed with a thickness of 1 micrometer on a lower surface of the elastic layer 110, and an adhesive layer 130 including 100 parts by weight of an acrylic copolymer, 2 parts by weight of a curing agent, and 115 parts by weight of a solvent was formed with a thickness of 7 micrometers on a lower surface of the primer layer 140, thereby preparing a protective film 100 for a windshield of a vehicle that does not require a thermoforming process. That is, based on the structure and components of the protective film 100 for the windshield of the vehicle according to Example 1, the primer layer 140 including the UV blocking agent and the IR blocking agent was prepared between the elastic layer 110 and the adhesive layer 130, and the protective film 100 may have the structure the same as the structure shown in FIG. 2(A) described above.

EXAMPLE 4

An elastic layer 110 including 35 parts by weight of a polyurethane acrylate oligomer, 63 parts by weight of an acrylate monomer, and 0.9 parts by weight of a photoinitiator was formed with a thickness of 150 micrometers, a self-healing layer 120 including 100 parts by weight of a urethane resin, 40 parts by weight of an isocyanate curing agent and 7 parts by weight of an IR blocking agent was formed with a thickness of 25 micrometers on an upper surface of the elastic layer 110 through a primary coating, a primer layer 140 including 100 parts by weight of a urethane resin and 8 parts by weight of an isocyanate curing agent was formed with a thickness of 1 micrometer on a lower surface of the elastic layer 110, and an adhesive layer 130 including 100 parts by weight of an acrylic copolymer, 2 parts by weight of a curing agent, 115 parts by weight of a solvent, and 5 parts by weight of a UV blocking agent was formed with a thickness of 7 micrometers on a lower surface of the primer layer 140, thereby preparing a protective film 100 for a windshield of a vehicle that does not require a thermoforming process. That is, based on the structure and components of the protective film 100 for the windshield of the vehicle according to Example 2, the IR blocking agent was added to the self-healing layer 120 and the UV blocking agent was added to the adhesive layer 130, and the protective film 100 may have the structure the same as the structure shown in FIG. 2(A) described above.

Experiment Result for Comparison of Protective Film Characteristics #2

Table 6 is a result of measuring the time required to attach Examples 1 to 4 according to the present invention to the curved portion of the windshield of the vehicle.

TABLE 6

| Protective film | Installation completion time (minutes) |
|---|---|
| Example 1 | 20 |
| Example 2 | 20 |
| Example 3 | 20 |
| Example 4 | 20 |

As described above, it took 20 minutes to attach Example 1 of the present invention to the curved portion of the windshield of the vehicle. As shown in Table 6, it took the same time of 20 minutes to attach Examples 2 to 4, in which the primer layer 140 or the UV blocking agent and the IR blocking agent were added, to the curved portion of the windshield of the vehicle.

Therefore, unlike Example 1, even when the protective film 100 for the windshield of the vehicle according to an embodiment of the present invention includes the primer layer 140, or the UV blocking agent and the IR blocking agent, the physical properties do not change and it was confirmed that Examples 2 to 4 were also excellent in workability when attached to the curved portion of the windshield of the vehicle.

Table 7 is the results of measuring the impact resistance properties of Examples 1 to 4 according to the present invention by using Du pont impact test equipment shown in FIG. 3. As described above, in the Du pont impact test, energy was measured at the point where glass was not broken through the potential energy formula by confirming the condition of breaking the glass when an impact is applied on the protective film in a state in which the protective film 100 for the windshield of the vehicle was attached to the same glass.

TABLE 7

| Protective film | Maximum potential energy (mJ) |
|---|---|
| Example 1 | 2450 |
| Example 2 | 2450 |
| Example 3 | 2450 |
| Example 4 | 2450 |

As described above, the potential energy value of Example 1 of the present invention is 2450 mJ. As shown in Table 7, the same potential energy values were also recorded in Examples 2 to 4 in which the primer layer 140 or the UV blocking agent and the IR blocking agent were added as compared with Example 1.

Therefore, it was confirmed that physical properties are not changed even if the protective film 100 for the windshield of the vehicle according to an embodiment of the present invention includes the primer layer 140, or the UV blocking agent and the IR blocking agent unlike Example 1, and Examples 2 to 4 were also confirmed that the impact absorption capacity is higher than that of the conventional PET base film.

Table 8 is the results of measuring the scratch characteristics of the protective film 100 for the windshield of the vehicle by using Rubbing test equipment shown in FIG. 5. As described above, in the Rubbing test, steel wool (#0000) reciprocated on the surface of the protective film 100 for the windshield of the vehicle by 500 times with 80 rpm, and the occurrence of scratches on the surface was confirmed.

TABLE 8

| Protective film | Surface condition after test |
|---|---|
| Example 1 | Full restoration |
| Example 2 | Full restoration |
| Example 3 | Full restoration |
| Example 4 | Full restoration |

As described above, the scratches were occurred in Example 1 of the present invention, but all scratches were healed by the self-healing layer 120. As shown in Table 8, the scratches were also occurred in Examples 2 to 4 in which the primer layer 140 was added or the UV blocking agent and the IR blocking agent were added as compared with Example 1, but all scratches were healed by the self-healing layer 120.

Therefore, it was confirmed that physical properties are not changed even if the protective film 100 for the windshield of the vehicle according to an embodiment of the present invention includes the primer layer 140, or the UV blocking agent and the IR blocking agent unlike Example 1, and Examples 2 to 4 were also confirmed to have the function of maintaining the surface in the same manner as the hard coating type protective film.

That is, as described above, it was confirmed that the physical properties did not change compared to the protective film 100 for the windshield of the vehicle including the elastic layer 110, the self-healing layer 120 and the adhesive layer 130 even if the primer layer 140, or the UV blocking agent and the IR blocking agent are added to the protective film 100 for the windshield of the vehicle according to an embodiment of the present invention.

Table 9 is the results of measuring the durability characteristics of Examples 1 to 4 according to the present invention. As described above, the film was irradiated with the same amount of UV light to measure the Yellowing index through a colorimeter, and the durability of the film was measured based on the variation of the measured value b*.

TABLE 9

| Protective film | variation of b*value |
|---|---|
| Example 1 | 0.93 |
| Example 2 | 0.99 |
| Example 3 | 0.87 |
| Example 4 | 0.85 |

As described above, the variation of the b* value of Example 1 is 0.93. As shown in Table 9, the variation of the b* value of Example 2 is 0.99, the variation of the b* value of Example 3 is 0.87, and the variation of the b* value of Example 4 is 0.85. That is, Example 2 represented a relatively high variation of the b* value compared to Example 1, but the variation was similar to or lower than that of the aforementioned Comparative Examples, and Examples 3 and 4 represented a relatively low variation of the b* value compared to Example 1.

Therefore, it was confirmed that the degradation in the durability of the film due to the continuous exposure to the ultraviolet rays was relieved as the UV blocking agent and the IR blocking agent were added to the protective film 100 for the windshield of the vehicle according to an embodiment of the present invention.

Table 10 is the results of comparing the UV blocking rate and IR blocking rate of Examples 1 to 4 of the present invention. As described above, the UV blocking rate and IR blocking rate were measured by using the light transmittance meter.

TABLE 10

| Protective film | UV blocking rate/IR blocking rate (%/%) |
| --- | --- |
| Example 1 | 22.1/18.4 |
| Example 2 | 21.7/18.6 |
| Example 3 | 99.9/81.1 |
| Example 4 | 99.9/79.8 |

As described above, the UV blocking rate and IR blocking rate of Example 1 of the present invention were 22.1 and 18.4%, respectively. As shown in Table 10, the UV blocking rate and IR blocking rate of Example 2 were 21.7 and 18.6%, respectively, the UV blocking rate and IR blocking rate of Example 3 were 99.9 and 81.1%, respectively, and the UV blocking rate and IR blocking rate of Example 4 were 99.9 and 79.8%, respectively.

Therefore, it was confirmed that the UV blocking rate and the IR blocking rate were significantly improved when the protective film 100 for the windshield of the vehicle according to an embodiment of the present invention includes the primer layer 140, and the UV blocking agent and the IR blocking agent were added to the primer layer 140, or the self-healing layer 120 and the adhesive layer 130. However, the results of this experiment were obtained through one embodiment, and, as described above, at least one of the adhesive layer 130, the elastic layer 110, the self-healing layer 120 and the primer layers 140 constituting the protective film 100 for the windshield of the vehicle according to the present invention may further include at least one of the UV blocking agent and the IR blocking agent, and the protective film 100 for the windshield of the vehicle composed of at least one layer including at least one of the UV blocking agent and the IR blocking agent may block 99.9% of ultraviolet rays harmful to the human body and about 80% of infrared rays.

Figure 7:
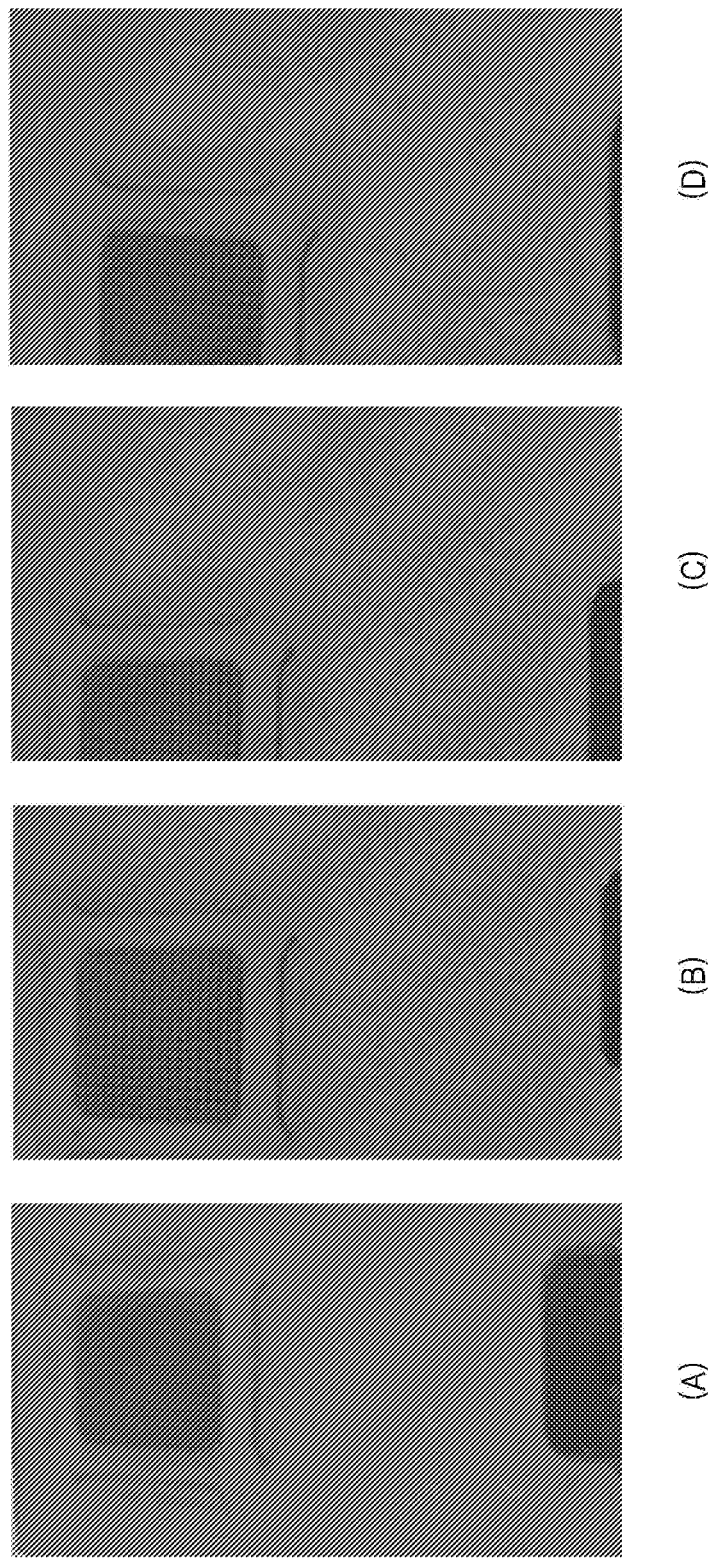
FIG. 7 is a schematic view showing the result of an adhesion test for a protective film for a windshield of a vehicle according to an embodiment of the present invention.

Table 11 shows the adhesion test results of Examples 1 to 4 according to the present invention, and FIG. 7 is a schematic view showing the results of the adhesion test of the protective film 100 for the windshield of the vehicle according to an embodiment of the present invention. Preferably, the protective films of Examples 1 to 4 were attached to the same glass plate and left for 24 hours at the temperature of 60° C. and the adhesion test was performed by checking the amount of adhesive remaining on the glass plate when the protective film was peeled off from the glass plate. The part marked with a circle in (A) of FIG. 7 is a place where the adhesive transfer was made.

TABLE 11

| Protective film | Glass surface condition after film peeling |
| --- | --- |
| Example 1 | Transfer phenomenon O |
| Example 2 | Transfer phenomenon X |
| Example 3 | Transfer phenomenon X |
| Example 4 | Transfer phenomenon X |

As shown in Table 11, when the glass surface was checked after peeling off the protective film of Example 1, a small amount of the adhesive was transferred and remained on the glass surface, and when the glass surface was checked after peeling off the protective films of Examples 2 to 4, the adhesive was not transferred to the glass plate. This can also be confirmed in FIG. 7. FIG. 7(A) shows the glass surface after the adhesion test of Example 1, and it can be seen that a small amount of the adhesive was transferred and remained on the glass surface. FIG. 7(B) shows the glass surface after the adhesion test of Example 2, and it can be seen that the adhesive was not transferred to the glass plate. FIG. 7(C) shows the glass surface after the adhesion test of Example 3, and it can be seen that the adhesive was not transferred to the glass plate. FIG. 7(D) shows the glass surface after the adhesion test of Example 4, and it can be seen that the adhesive was not transferred to the glass plate.

Therefore, it was confirmed that the protective film 100 has the excellent adhesion property when the protective film 100 for the windshield of the vehicle according to an embodiment of the present invention includes the primer layer 140. In addition, when compared with the case where the protective film 100 for the windshield of the vehicle includes the primer layer 140 through Examples 3 and 4, it was confirmed that the adhesion property of the protective film 100 for the windshield of the vehicle was not changed even when the primer layer 140 according to an embodiment of the present invention includes the UV blocking agent and the IR blocking agent, or even when at least one of the elastic layer 110, the self-healing layer 120, and the adhesive layer 130 includes at least one of the UV blocking agent and the IR blocking agent.

The description of the presented embodiments is provided to enable any person skilled in the art to use or implement the present invention. Various modifications to these embodiments will be apparent to those having ordinary skill in the art, and the general principles defined herein can be applied to other embodiments without departing from the scope of the present invention. Thus, the present invention is not limited to the embodiments proposed herein, but is construed in the broadest scope consistent with the principles and novel features presented herein.

What is claimed is:

1. A protective film for a windshield of a vehicle, the protective film comprising:
an adhesive layer including an acrylic copolymer, a curing agent, and a solvent;
an elastic layer, disposed on the adhesive layer, including a polyurethane acrylate oligomer, an acrylate monomer, and a photoinitiator; and
a self-healing layer, disposed on the elastic layer, consisting of 100 parts by weight of a urethane resin and 30 to 50 parts by weight of an isocyanate curing agent, and having a function of healing scratches and impact resistance,
wherein the elastic layer having a thickness greater than a thickness of the self-healing layer is laminated between the self-healing layer and the adhesive layer, the elastic layer formed from a composition consisting of (i) 25 to 40 parts by weight of the polyurethane acrylate oligomer, (ii) 50 to 70 parts by weight of the acrylate monomer, and (iii) 0.1 to 5 parts by weight of the photoinitiator;
and wherein the protective film is attached to a curved portion of the windshield of the vehicle without a thermoforming process by an elastic force of the elastic layer.

2. The protective film of claim 1, wherein the adhesive layer includes 100 parts by weight of the acrylic copolymer, 0.1 to 5 parts by weight of the curing agent, and 90 to 110 parts by weight of the solvent.

3. The protective film of claim 1, wherein the elastic layer has a thickness of 100 to 200 micrometers, the self-healing layer has a thickness of 20 to 40 micrometers, and the adhesive layer has a thickness of 5 to 15 micrometers.

4. The protective film of claim 1, wherein the protective film has impact resistance characteristics of 2000 mJ or more based on a Du pont impact test.

5. The protective film of claim 1, further comprising:
   a primer layer disposed at one or more positions between the elastic layer and the self-healing layer, and between the elastic layer and the adhesive layer, and including a urethane resin and an isocyanate curing agent.

6. The protective film of claim 5, wherein the primer layer includes 100 parts by weight of the urethane resin, and 1 to 10 parts by weight of the isocyanate curing agent.

7. The protective film of claim 6, wherein the primer layer further includes at least one of a UV blocking agent and an IR blocking agent.

8. The protective film of claim 1, wherein at least one of the adhesive layer, the elastic layer, and the self-healing layer further includes at least one of a UV blocking agent and an IR blocking agent.

* * * * *